United States Patent
Ohmae et al.

(10) Patent No.: US 12,158,208 B2
(45) Date of Patent: Dec. 3, 2024

(54) FLOW PASSAGE UNIT

(71) Applicant: NIPPON PILLAR PACKING CO., LTD., Osaka (JP)

(72) Inventors: Kiyotaka Ohmae, Osaka (JP); Masashi Katanaya, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 55 days.

(21) Appl. No.: 17/909,136

(22) PCT Filed: Jan. 14, 2021

(86) PCT No.: PCT/JP2021/001034
§ 371 (c)(1),
(2) Date: Sep. 2, 2022

(87) PCT Pub. No.: WO2021/176854
PCT Pub. Date: Sep. 10, 2021

(65) Prior Publication Data
US 2023/0341052 A1    Oct. 26, 2023

(30) Foreign Application Priority Data

Mar. 3, 2020   (JP) ................................ 2020-036097

(51) Int. Cl.
*F16J 15/10*    (2006.01)
*F15B 13/08*    (2006.01)
(Continued)

(52) U.S. Cl.
CPC ............ *F16J 15/106* (2013.01); *F16L 41/03* (2013.01); *F15B 13/0821* (2013.01); *F16K 27/003* (2013.01); *Y10T 137/87885* (2015.04)

(58) Field of Classification Search
CPC ........................................... Y10T 137/87885
(Continued)

(56) References Cited

U.S. PATENT DOCUMENTS 3,189,371 A * 6/1965 Swan ...................... F16L 49/04
                                                          285/55
8,191,933 B2 * 6/2012 Rao ........................ F16J 15/104
                                                         285/364
(Continued)

FOREIGN PATENT DOCUMENTS

JP    H8312900 A    11/1996
JP    200386579 A    3/2003
(Continued)

OTHER PUBLICATIONS

English Translation of International Search Report for PCT/JP2021/001034 dated Apr. 6, 2021.
(Continued)

*Primary Examiner* — Robert K Arundale
(74) *Attorney, Agent, or Firm* — Millen, White, Zelano & Branigan P.C.; William F. Nixon

(57) ABSTRACT

A flow passage unit 1 includes a base plate 2 and a plurality of fluid devices 3 provided on the base plate 2. The plurality of fluid devices 3 include a first fluid device 31 having a first flow passage hole 31b, and a second fluid device 32 having a second flow passage hole 32b. The first fluid device 31 is disposed on an upper side of the base plate 2 and detachably provided on the base plate 2, and the second fluid device 32 is disposed on a lower side of the base plate 2 and detachably provided on the base plate 2. The base plate 2 has a first through hole 21 formed so as to penetrate the base plate 2 in a thickness direction of the base plate 2 to provide communication between the first flow passage hole 31b and the second flow passage hole 32b.

2 Claims, 5 Drawing Sheets

(51) Int. Cl.
*F16K 27/00* (2006.01)
*F16L 41/03* (2006.01)

(58) Field of Classification Search
USPC .......................... 285/139.2, 141.1, 336, 352
See application file for complete search history.

(56) References Cited

U.S. PATENT DOCUMENTS

| | | | |
|---|---|---|---|
| 2003/0102040 A1* | 6/2003 | Fukano | F15B 13/0821 |
| | | | 137/884 |
| 2004/0089837 A1 | 5/2004 | Bauer et al. | |
| 2015/0068613 A1 | 3/2015 | Taskar et al. | |
| 2021/0159093 A1 | 5/2021 | Melcer et al. | |
| 2021/0193487 A1 | 6/2021 | Melcer et al. | |
| 2022/0028705 A1 | 1/2022 | Melcer et al. | |

FOREIGN PATENT DOCUMENTS

| | | | |
|---|---|---|---|
| JP | 2005140230 A | 6/2005 | |
| JP | 2019518175 A | 6/2019 | |

OTHER PUBLICATIONS

English Machine Translation of JP200386579, Publication Date: Mar. 20, 2003.
English Machine Translation of JP2005140230, Publication Date: Jun. 2, 2005.
English Machine Translation of JPH8312900A, Publication Date: Jun. 27, 2019.

\* cited by examiner

FLOW PASSAGE UNIT

TECHNICAL FIELD

The present invention relates to a flow passage unit.

BACKGROUND ART

As a flow passage unit that is used when delivering and circulating a fluid such as chemical solutions in manufacturing processes in various technical fields such as semiconductors, liquid crystal devices, and organic EL devices, a flow passage unit that includes a plurality of fluid devices such as pumps, valves, accumulators, filters, flow meters, pressure sensors, and pipes, and a plurality of substrate blocks each connecting flow passage holes formed in two fluid devices, is known (see, for example, FIG. 11A of PATENT LITERATURE 1).

Inside each substrate block described in PATENT LITERATURE 1, a U-shaped flow passage is formed, and both ends of the flow passage are open in the upper surface of the substrate block. A plurality of fluid devices are provided on the upper surface of the substrate block so as to be aligned in a horizontal direction. Of two adjacent fluid devices, the flow passage hole of one fluid device is connected to the opening on one side of the flow passage of the substrate block, and the flow passage hole of the other fluid device is connected to the opening on the other side of the flow passage of the substrate block. The flow passage holes of all the fluid devices are connected in order via the flow passages of the substrate blocks as described above. Accordingly, it is not necessary to directly connect all the fluid devices, so that each fluid device can be individually attached to or detached from the substrate block.

CITATION LIST

Patent Literature

PATENT LITERATURE 1: Japanese Laid-Open Patent Publication No. 2019-518175 (Japanese Translation of PCT International Application)

SUMMARY OF THE INVENTION

Technical Problem

A flow passage unit that is used in manufacturing processes for semiconductors, liquid crystal devices, organic EL devices, etc., is preferably configured to be compact in order to reduce the installation space for the flow passage unit. However, in the flow passage unit disclosed in PATENT LITERATURE 1, all the fluid devices need to be aligned in the horizontal direction along the upper surfaces of the substrate blocks such that the flow passage holes of the plurality of fluid devices are connected in order via the flow passages of the substrate blocks. Therefore, an installation space that is relatively large in the horizontal direction is required when installing the flow passage unit.

The present invention has been made in view of such circumstances, and an object of the present invention is to provide a flow passage unit that can connect flow passage holes of a plurality of fluid devices in a compact configuration and that allows the plurality of fluid devices to be individually attached thereto or detached therefrom.

Solution to Problem (1) A flow passage unit of the present invention is a flow passage unit including a base plate and a plurality of fluid devices provided on the base plate, wherein the plurality of fluid devices include at least a first fluid device having a first flow passage hole, and a second fluid device having a second flow passage hole, the first fluid device is disposed on one side in a thickness direction of the base plate and detachably provided on the base plate, the second fluid device is disposed on another side in the thickness direction of the base plate and detachably provided on the base plate, and the base plate has a through hole formed so as to penetrate the base plate in the thickness direction of the base plate to provide communication between the first flow passage hole and the second flow passage hole.

According to the present invention, the first fluid device and the second fluid device are disposed separately on the one side and the other side in the thickness direction of the base plate, and the first flow passage hole of the first fluid device and the second flow passage hole of the second fluid device are caused to communicate with each other by the through hole penetrating the base plate in the thickness direction thereof. Accordingly, the flow passage holes of the first fluid device and the second fluid device can be caused to communicate with each other in a state where the flow passage unit is configured to be compact in a direction orthogonal to the thickness direction of the base plate as compared to the case where all fluid devices are aligned on one side in the thickness direction of a base plate as in the conventional art. In addition, since the first fluid device and the second fluid device are detachably provided on the base plate, the first fluid device and the second fluid device can be individually attached to or detached from the base plate.

(2) Preferably, the flow passage unit further includes a gasket disposed in the through hole, and the gasket has: a tubular gasket body having a communication flow passage formed therein so as to provide communication between the first flow passage hole and the second flow passage hole; a first sealing portion provided on one side in an axial direction of the gasket body and detachably connected to the first fluid device to seal a connection portion therebetween; and a second sealing portion provided on another side in the axial direction of the gasket body and detachably connected to the second fluid device to seal a connection portion therebetween.

In this case, the first sealing portion of the gasket is connected to the first fluid device, and the second sealing portion of the gasket is connected to the second fluid device, whereby the connection portions therebetween are sealed by the first sealing portion and the second sealing portion. In addition, the first flow passage hole and the second flow passage hole can be caused to communicate with each other by the communication flow passage in the gasket. Therefore, by using the gasket, the flow passage holes of the first fluid device and the second fluid device can be caused to communicate with each other such that a fluid does not leak.

(3) Preferably, a length in the axial direction of the gasket is longer than a length of the through hole.

In this case, at least one end portion in the axial direction of the gasket projects to the outside of the through hole of the base plate. Accordingly, when the fluid device connected to the one end portion in the axial direction of the gasket is removed from the gasket, the gasket can be easily removed from the base plate by grasping the portion, of the gasket, projecting from the through hole.

Advantageous Effects of the Invention

According to the present invention, the flow passage holes of the plurality of fluid devices can be connected in a smaller space, and the plurality of fluid devices can be individually attached or detached.

DETAILED DESCRIPTION

First Embodiment

First, preferred embodiments of the present invention will be described with reference to the accompanying drawings. At least some parts of a plurality of embodiments described below may be combined together as desired.

Figure 1:
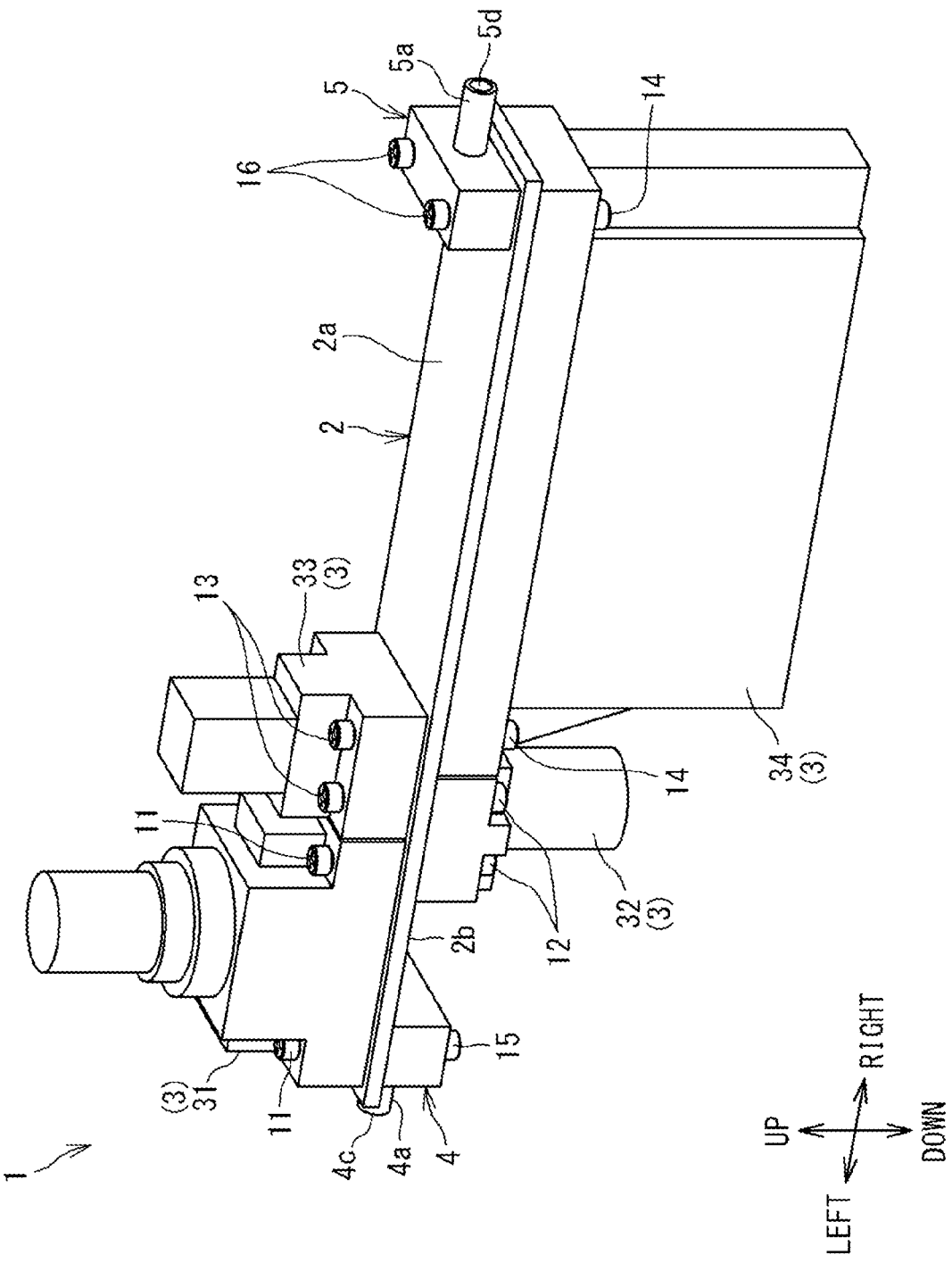
FIG. 1 is a perspective view showing a flow passage unit according to a first embodiment of the present invention.

FIG. 1 is a perspective view showing a flow passage unit according to a first embodiment of the present invention. In FIG. 1, a flow passage unit 1 of the present embodiment is used when delivering and circulating a chemical solution used in a semiconductor manufacturing apparatus, for example. In the following specification, directions such as up, down, left, and right mean the directions shown in FIG. 1.

The flow passage unit 1 includes a base plate 2, a plurality of fluid devices 3, an inflow pipe block 4, and an outflow pipe block 5.

The base plate 2 is composed of, for example, a rectangular flat plate having a predetermined thickness in the up-down direction, and is formed so as to extend long in the right-left direction.

The plurality of fluid devices 3 include, for example, a first fluid device 31, a second fluid device 32, a third fluid device 33, and a fourth fluid device 34. Each of the fluid devices 31 to 34 is composed of a pump, a valve, an accumulator, a filter, a flow meter, a pressure sensor, or the like, and is formed in a block shape. In addition, these fluid devices 31 to 34 have a first installation surface 31a, a second installation surface 32a, a third installation surface 33a, and a fourth installation surface 34a which are located on the base plate 2, respectively (see FIG. 2).

The first fluid device 31 and the third fluid device 33 are disposed in a state where the installation surfaces 31a and 33a thereof are located on an upper surface 2a of the base plate 2. In FIG. 1, the first fluid device 31 is disposed close to the left end of the upper surface 2a of the base plate 2, and the third fluid device 33 is disposed on the upper surface 2a of the base plate 2 so as to be close to and on the right side of the first fluid device 31. The first fluid device 31 is detachably fixed to the upper surface 2a of the base plate 2 by a plurality of bolts 11. The third fluid device 33 is detachably fixed to the upper surface 2a of the base plate 2 by a plurality of bolts 13.

The second fluid device 32 and the fourth fluid device 34 are disposed in a state where the installation surfaces 32a and 34a thereof are located on a lower surface 2b of the base plate 2. In FIG. 1, the fourth fluid device 34 is disposed close to the right end of the lower surface 2b of the base plate 2, and the second fluid device 32 is disposed on the lower surface 2b of the base plate 2 so as to be close to and on the left side of the fourth fluid device 34. The second fluid device 32 is detachably fixed to the lower surface 2b of the base plate 2 by a plurality of bolts 12. The fourth fluid device 34 is detachably fixed to the lower surface 2b of the base plate 2 by a plurality of bolts 14.

The inflow pipe block 4 is a pipe block into which a chemical solution flows from the outside. The inflow pipe block 4 is disposed at the left end of the lower surface 2b of the base plate 2. The inflow pipe block 4 is detachably fixed to the lower surface 2b of the base plate 2 by a plurality of bolts 15 (only one bolt is shown in FIG. 1). The inflow pipe block 4 has a projection pipe portion 4a projecting to the left side. An inlet 4c into which the chemical solution flows is formed at a distal end of the projection pipe portion 4a.

The outflow pipe block 5 is a pipe block from which the chemical solution is discharged to the outside. The outflow pipe block 5 is disposed at the right end of the upper surface 2a of the base plate 2. The outflow pipe block 5 is detachably fixed to the upper surface 2a of the base plate 2 by a plurality of bolts 16. The outflow pipe block 5 has a projection pipe portion 5a projecting to the right side. An outlet 5d from which the chemical solution flows out is formed at a distal end of the projection pipe portion 5a.

Figure 2:
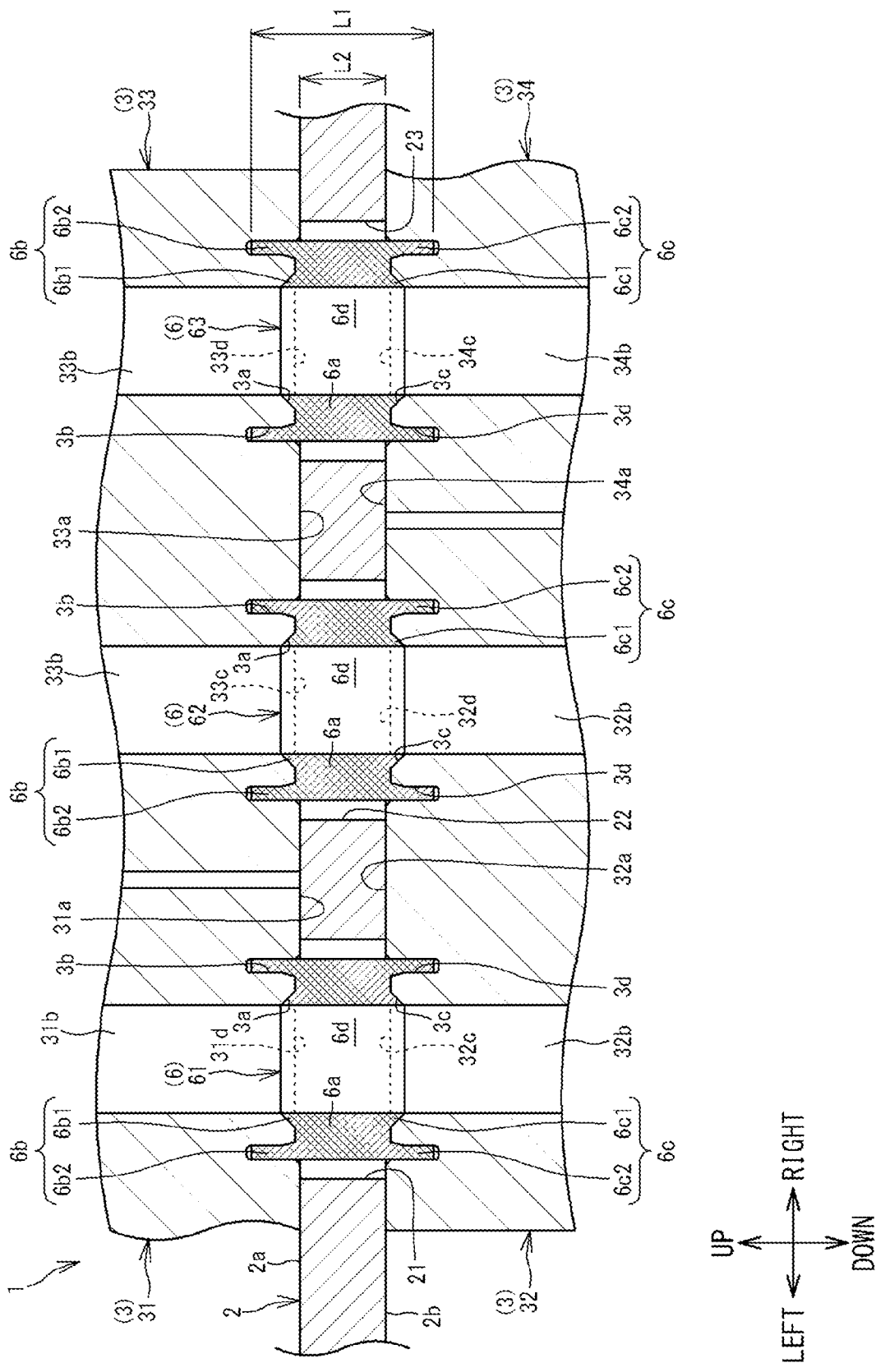
FIG. 2 is a cross-sectional view of a main part of the flow passage unit.

FIG. 2 is a cross-sectional view of a main part of the flow passage unit 1. In FIG. 2, a first flow passage hole 31b, a second flow passage hole 32b, a third flow passage hole 33b, and a fourth flow passage hole 34b through which the chemical solution flows are formed inside the first to fourth fluid devices 31 to 34, respectively. The hole diameters of these flow passage holes 31b to 34b are all set to substantially the same dimension.

Both an inlet (not shown) and an outlet 31d of the first flow passage hole 31b are formed so as to be open in the first installation surface 31a. The inlet of the first flow passage hole 31b communicates with the inlet 4c (see FIG. 1) of the inflow pipe block 4 via flow passage holes (not shown) formed inside the inflow pipe block 4 and the base plate 2, respectively. The outlet 31d of the first flow passage hole 31b is formed in a right end portion of the first fluid device 31.

Both an inlet 32c and an outlet 32d of the second flow passage hole 32b are formed so as to be open in the second installation surface 32a. The inlet 32c of the second flow passage hole 32b is formed at a position below the outlet 31d of the first flow passage hole 31b in a left end portion of the second fluid device 32. The outlet 32d of the second flow passage hole 32b is formed in a right end portion of the second fluid device 32.

Both an inlet 33c and an outlet 33d of the third flow passage hole 33b are formed so as to be open in the third installation surface 33a. The inlet 33c of the third flow passage hole 33b is formed at a position above the outlet 32d of the second flow passage hole 32b in a left end portion of the third fluid device 33. The outlet 33d of the third flow passage hole 33b is formed in a right end portion of the third fluid device 33.

Both an inlet 34c and an outlet (not shown) of the fourth flow passage hole 34b are formed so as to be open in the fourth installation surface 34a. The inlet 34c of the fourth flow passage hole 34b is formed at a position below the outlet 33d of the third flow passage hole 33b in a left end portion of the fourth fluid device 34. The outlet of the fourth flow passage hole 34b communicates with the outlet 5d (see FIG. 1) of the outflow pipe block 5 via flow passage holes (not shown) formed inside the base plate 2 and the outflow pipe block 5, respectively.

The base plate 2 has a first through hole 21, a second through hole 22, and a third through hole 23 which are formed so as to penetrate the base plate 2 in the thickness direction thereof. The hole diameters of these through holes 21 to 23 are set to dimensions larger than the outer diameters of gaskets 6 described later.

The first through hole 21 is formed at a position at which communication between the outlet 31d of the first flow passage hole 31b and the inlet 32c of the second flow passage hole 32b is provided, in the base plate 2. The second through hole 22 is formed at a position at which communication between the outlet 32d of the second flow passage hole 32b and the inlet 33c of the third flow passage hole 33b is provided, in the base plate 2. The third through hole 23 is formed at a position at which communication between the outlet 33d of the third flow passage hole 33b and the inlet 34c of the fourth flow passage hole 34b is provided, in the base plate 2.

The flow passage unit 1 further includes a plurality of gaskets 6. The plurality of gaskets 6 include a first gasket 61 disposed in the first through hole 21, a second gasket 62 disposed in the second through hole 22, and a third gasket 63 disposed in the third through hole 23.

The first gasket 61 to the third gasket 63 are formed in the same shape, and lengths L1 in the axial direction thereof are longer than lengths L2 in the up-down direction of the first through hole 21 to the third through hole 23. Upper end portions (one end portions in the axial direction) of the first gasket 61 to the third gasket 63 are disposed so as to project above the base plate 2. In addition, lower end portions (other end portions in the axial direction) of the first gasket 61 to the third gasket 63 are disposed so as to project below the base plate 2.

Each gasket 6 has a gasket body 6a, a first sealing portion 6b provided on the upper side (one side in the axial direction) of the gasket body 6a, and a second sealing portion 6c provided on the lower side (other side in the axial direction) of the gasket body 6a.

Each gasket body 6a is formed in a cylindrical shape, for example. Inside the gasket bodies 6a disposed in order from the left of FIG. 2, communication flow passages 6d are formed so as to provide communication between the upper flow passage holes 31b, 33b, and 33b and the lower flow passage holes 32b, 32b, and 34b, respectively. The hole diameters of the communication flow passages 6d are set to substantially the same dimensions as the hole diameters of the flow passage holes 31b, 32b, 33b, and 34b.

The first sealing portion 6b has, for example, an annular radially inner sealing portion 6b1 and an annular radially outer sealing portion 6b2.

The radially inner sealing portion 6b1 is formed on the radially inner side of the gasket body 6a so as to project upward. The radially inner sealing portion 6b1 is press-fitted into a radially inner sealing groove 3a which is formed on the upper fluid device 3 (31, 33).

The radially outer sealing portion 6b2 is formed on the radially outer side of the gasket body 6a so as to project upward. The radially outer sealing portion 6b2 is press-fitted into a radially outer sealing groove 3b which is formed on the upper fluid device 3.

Accordingly, the first sealing portion 6b is detachably connected to the upper fluid device 3 and seals a connection portion therebetween.

The second sealing portion 6c has, for example, an annular radially inner sealing portion 6c1 and an annular radially outer sealing portion 6c2.

The radially inner sealing portion 6c1 is formed on the radially inner side of the gasket body 6a so as to project downward. The radially inner sealing portion 6c1 is press-fitted into a radially inner sealing groove 3c which is formed on the lower fluid device 3 (32, 34).

The radially outer sealing portion 6c2 is formed on the radially outer side of the gasket body 6a so as to project downward. The radially outer sealing portion 6c2 is press-fitted into a radially outer sealing groove 3d which is formed on the lower fluid device 3.

Accordingly, the second sealing portion 6c is detachably connected to the lower fluid device 3 and seals a connection portion therebetween.

Owing to the above configuration, the chemical solution flowing in through the inlet 4c of the inflow pipe block 4 passes through the first flow passage hole 31b of the first fluid device 31, the communication flow passage 6d of the first gasket 61, the second flow passage hole 32b of the second fluid device 32, the communication flow passage 6d of the second gasket 62, the third flow passage hole 33b of the third fluid device 33, the communication flow passage 6d of the third gasket 63, and the fourth flow passage hole 34b of the fourth fluid device 34 in this order, and is then discharged from the outlet 5d of the outflow pipe block 5.

In the flow passage unit 1 of the first embodiment, the first fluid device 31 and the third fluid device 33 are disposed on the upper side of the base plate 2, and the second fluid device 32 and the fourth fluid device 34 are disposed on the lower side of the base plate 2. The flow passage holes 31b, 33b, and 33b of the upper fluid devices 31 and 33 and the flow passage holes 32b, 32b, and 34b of the lower fluid devices 32 and 34 are caused to communicate with each other by the communication flow passages 6d of the first to third gaskets 61, 62, and 63 which are disposed in the through holes 21, 22, and 23 of the base plate 2, respectively. Accordingly, the upper flow passage holes 31b, 33b, and 33b and the lower flow passage holes 32b, 32b, and 34b can be caused to communicate with each other in a state where the flow passage unit 1 is configured to be compact in the right-left direction of the base plate 2 as compared to the case where all fluid devices are aligned on the upper surface of a base plate as in the conventional art. In addition, since the fluid devices 31 to 34 are detachably provided on the base plate 2, the fluid devices 31 to 34 can be individually attached to or detached from the base plate 2.

Moreover, the first sealing portions 6b of the respective first to third gaskets 61, 62, and 63 are connected to the upper fluid devices 31 and 33, and the second sealing portions 6c of the respective first to third gaskets 61, 62, and 63 are connected to the lower fluid devices 32 and 34, whereby the connection portions therebetween can be sealed by the first sealing portion 6b and the second sealing portion 6c. Therefore, by using the first to third gaskets 61, 62, and 63, the upper flow passage holes 31b, 33b, and 33b and the lower flow passage holes 32b, 32b, and 34b can be caused to communicate with each other such that the chemical solution does not leak.

Moreover, the lengths L1 in the axial direction of the respective gaskets 6 are set so as to be longer than the lengths L2 of the through holes 21 to 23 of the base plate 2. When the upper fluid devices 31 and 33 are removed from the gaskets 6, the upper end portions (first sealing portions 6b) of the gaskets 6 project to the upper side (outside) of the through holes 21, 22, and 23 of the base plate 2. In addition, when the lower fluid devices 32 and 34 are removed from the gaskets 6, the lower end portions (second sealing portions 6c) of the gaskets 6 project to the lower side (outside) of the through holes 21, 22, and 23. Therefore, the gaskets 6 can be easily removed from the base plate 2 by grasping the portions, of the gaskets 6, projecting from the through holes 21, 22, and 23.

In the first embodiment, the plurality of fluid devices 3 include the four fluid devices 31 to 34, but may include at least two fluid devices. For example, the plurality of fluid devices 3 may include only the third fluid device 33 and the fourth fluid device 34. In this case, out of the third fluid device 33 and the fourth fluid device 34, one fluid device is a "first fluid device" disposed on one side in the thickness direction of the base plate 2, and the other fluid device is a "second fluid device" disposed on the other side in the thickness direction of the base plate 2.

Second Embodiment

Figure 3:
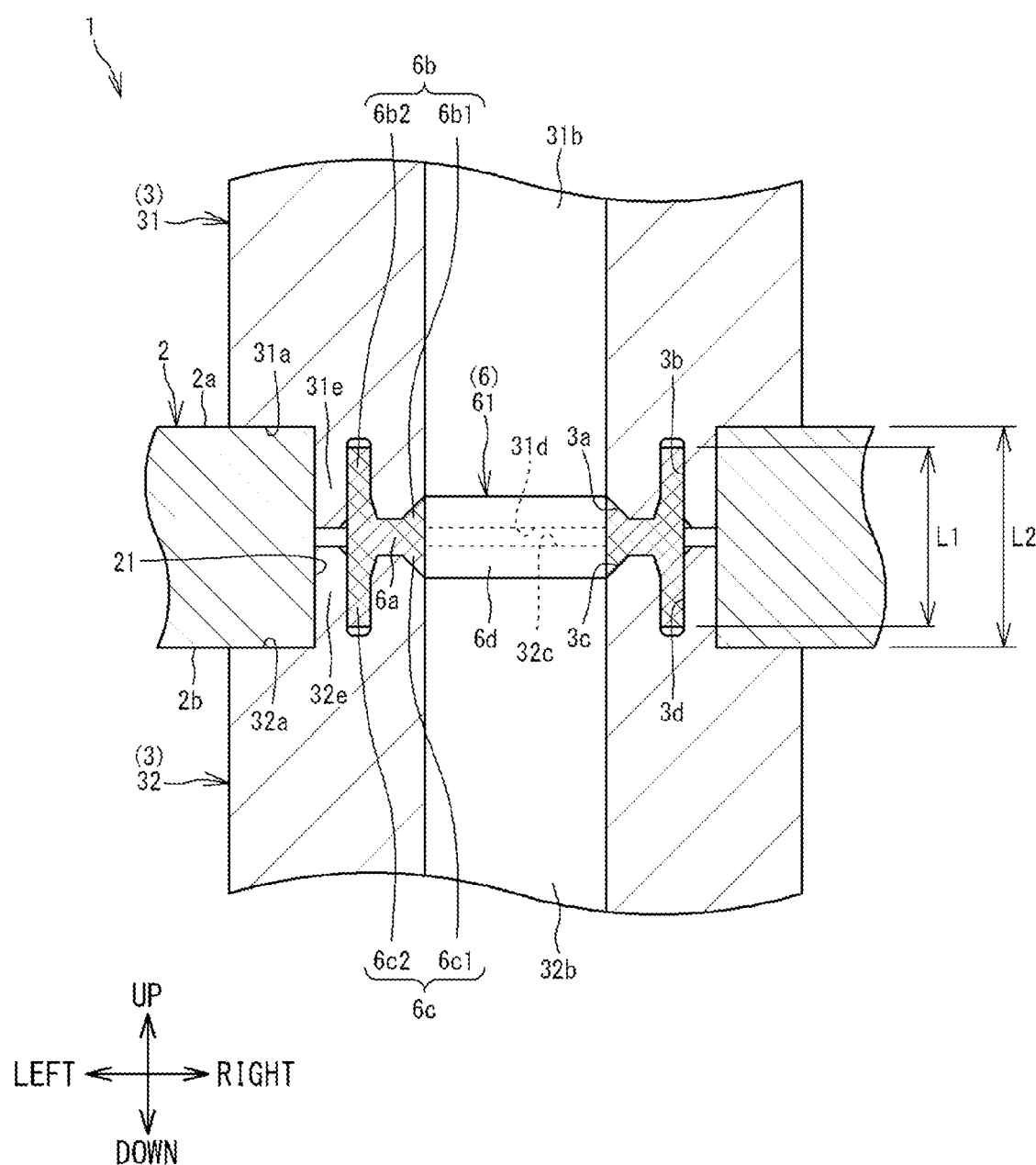
FIG. 3 is a cross-sectional view showing a main part of a flow passage unit according to a second embodiment of the present invention.

FIG. 3 is a cross-sectional view showing a main part of a flow passage unit according to a second embodiment of the present invention. In FIG. 3, in a flow passage unit 1 of the present embodiment, a plurality of fluid devices 3 include, for example, a first fluid device 31 and a second fluid device 32. The first fluid device 31 has a cylindrical first projection portion 31e projecting below a first installation surface 31a which is located on an upper surface 2a of a base plate 2. The second fluid device 32 has a cylindrical second projection portion 32e projecting above a second installation surface 32a which is located on a lower surface 2b of the base plate 2.

An outlet 31d of a first flow passage hole 31b is formed in the lower surface of the first projection portion 31e of the first fluid device 31. An inlet 32c of a second flow passage hole 32b is formed in the upper surface of the second projection portion 32e of the second fluid device 32. The inlet 32c of the second flow passage hole 32b is formed at a position below the outlet 31d of the first flow passage hole 31b.

The base plate 2 has a first through hole 21 formed so as to penetrate the base plate 2 in the thickness direction thereof. The first projection portion 31e of the first fluid device 31 is inserted into the first through hole 21 from the upper side thereof. In addition, the second projection portion 32e of the second fluid device 32 is inserted into the first through hole 21 from the lower side thereof.

A first gasket 61 is disposed in the first through hole 21 of the base plate 2. A length L1 in the axial direction of the first gasket 61 is equal to or shorter than a length L2 in the up-down direction of the first through hole 21. A radially inner sealing portion 6b1 and a radially outer sealing portion 6b2 in a first sealing portion 6b of the first gasket 61 are respectively press-fitted into a radially inner sealing groove 3a and a radially outer sealing groove 3b which are formed on the first projection portion 31e of the first fluid device 31. A radially inner sealing portion 6c1 and a radially outer sealing portion 6c2 in a second sealing portion 6c of the first gasket 61 are respectively press-fitted into a radially inner sealing groove 3c and a radially outer sealing groove 3d which are formed on the second projection portion 32e of the second fluid device 32.

Owing to the above configuration, the first flow passage hole 31b of the first fluid device 31 and the second flow passage hole 32b of the second fluid device 32 communicate with each other via a communication flow passage 6d of the first gasket 61. The other components of the present embodiment are the same as those of the first embodiment, and thus are designated by the same reference signs, and the description thereof is omitted.

In the flow passage unit 1 of the second embodiment, the first fluid device 31 is disposed on the upper side of the base plate 2, and the second fluid device 32 is disposed on the lower side of the base plate 2. The flow passage hole 31b of the first fluid device 31 and the flow passage hole 32b of the second fluid device 32 are caused to communicate with each other by the communication flow passage 6d of the first gasket 61 which is disposed in the first through hole 21 of the base plate 2. Accordingly, the first flow passage hole 31b and the second flow passage hole 32b can be caused to communicate with each other in a state where the flow passage unit 1 is configured to be compact in the right-left direction of the base plate 2 as compared to the case where all fluid devices are aligned on the upper surface of a base plate as in the conventional art. In addition, since the fluid devices 31 and 32 are detachably provided on the base plate 2, the fluid devices 31 and 32 can be individually attached to or detached from the base plate 2.

Moreover, the first sealing portion 6b of the first gasket 61 is connected to the first fluid device 31, and the second sealing portion 6c of the first gasket 61 is connected to the second fluid device 32, whereby the connection portions therebetween can be sealed by the first sealing portion 6b and the second sealing portion 6c. Therefore, by using the first gasket 61, the first flow passage hole 31b and the second flow passage hole 32b can be caused to communicate with each other such that a chemical solution does not leak.

Third Embodiment

Figure 4:
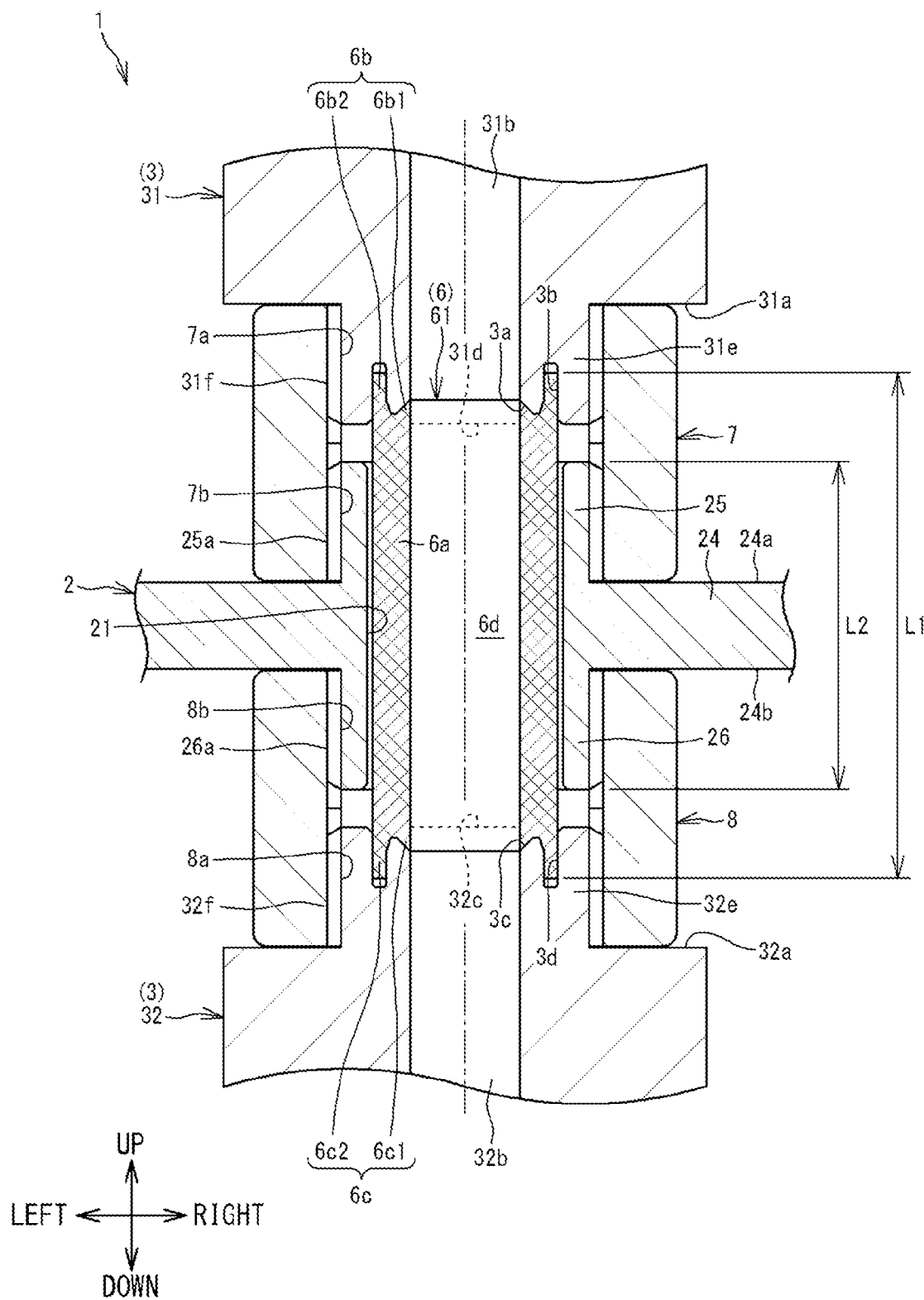
FIG. 4 is a cross-sectional view showing a main part of a flow passage unit according to a third embodiment of the present invention.

FIG. 4 is a cross-sectional view showing a main part of a flow passage unit according to a third embodiment of the present invention. A flow passage unit 1 of the present embodiment is a modification of the second embodiment. In FIG. 4, an external thread portion 31f is formed on the outer circumference of a first projection portion 31e of a first fluid device 31. An external thread portion 32f is formed on the outer circumference of a second projection portion 32e of a second fluid device 32. In the present embodiment, the external thread portions 31f and 32f of the first projection portion 31e and the second projection portion 32e are left-hand threads.

A base plate 2 has a plate body 24, a cylindrical first raised portion 25, and a cylindrical second raised portion 26. The first raised portion 25 is formed so as to project upward from an upper surface 24a of the plate body 24. The second raised portion 26 is formed so as to project downward from a lower surface 24b of the plate body 24.

An external thread portion 25a is formed on the outer circumference of the first raised portion 25. The second raised portion 26 is formed at a position that is opposite to the formation position of the first raised portion 25 across the plate body 24. An external thread portion 26a is formed on the outer circumference of the second raised portion 26. The external thread portions 25a and 26a of the first raised portion 25 and the second raised portion 26 are threads that are reverse to the respective external thread portions 31*f* and 32*f* of the first projection portion 31*e* and the second projection portion 32*e*. The external thread portions 25*a* and 26*a* of the present embodiment are right-hand threads.

The flow passage unit 1 of the present embodiment includes a first nut 7 which detachably fixes the first fluid device 31 to the base plate 2, and a second nut 8 which detachably fixes the second fluid device 32 to the base plate 2.

A first internal thread portion 7*a* is formed on the upper half of the inner circumference of the first nut 7, and a second internal thread portion 7*b* is formed on the lower half of the inner circumference of the first nut 7. The first internal thread portion 7*a* and the second internal thread portion 7*b* are threads that are reverse to each other. In the present embodiment, the first internal thread portion 7*a* is a left-hand thread, and the second internal thread portion 7*b* is a right-hand thread.

The first internal thread portion 7*a* of the first nut 7 is screwed to the external thread portion 31*f* of the first projection portion 31*e*. The second internal thread portion 7*b* of the first nut 7 is screwed to the external thread portion 25*a* of the first raised portion 25. Accordingly, the first projection portion 31*e* of the first fluid device 31 and the first raised portion 25 of the base plate 2 are connected by the first nut 7.

A first internal thread portion 8*a* is formed on the lower half of the inner circumference of the second nut 8, and a second internal thread portion 8*b* is formed on the upper half of the inner circumference of the second nut 8. The first internal thread portion 8*a* and the second internal thread portion 8*b* are threads that are reverse to each other. In the present embodiment, the first internal thread portion 8*a* is a left-hand thread, and the second internal thread portion 8*b* is a right-hand thread.

The first internal thread portion 8*a* of the second nut 8 is screwed to the external thread portion 32*f* of the second projection portion 32*e*. The second internal thread portion 8*b* of the second nut 8 is screwed to the external thread portion 26*a* of the second raised portion 26. Accordingly, the second projection portion 32*e* of the second fluid device 32 and the second raised portion 26 of the base plate 2 are connected by the second nut 8.

A first through hole 21 which is formed so as to penetrate the base plate 2 in the thickness direction of the base plate 2 is formed in the first raised portion 25 and the second raised portion 26 of the base plate 2. A first gasket 61 is disposed in the first through hole 21 of the base plate 2. A length L1 in the axial direction of the first gasket 61 is longer than lengths L2 in the up-down direction of the first through hole 21 to third through hole 23.

A radially inner sealing portion 6*b*1 and a radially outer sealing portion 6*b*2 of a first sealing portion 6*b* in the first gasket 61 are press-fitted into a radially inner sealing groove 3*a* and a radially outer sealing groove 3*b* of the first fluid device 31 by tightening the first nut 7. In a state where the first nut 7 is tightened, both end surfaces in the axial direction (up-down direction in FIG. 4) of the first nut 7 are brought into contact with a first installation surface 31*a* of the first fluid device 31 and the upper surface 24*a* of the plate body 24. Accordingly, the first installation surface 31*a* of the first fluid device 31 is located on the upper side of the base plate 2 via the first nut 7.

A radially inner sealing portion 6*c*1 and a radially outer sealing portion 6*c*2 of a second sealing portion 6*c* in the first gasket 61 are press-fitted into a radially inner sealing groove 3*c* and a radially outer sealing groove 3*d* of the second fluid device 32 by tightening the second nut 8. In a state where the second nut 8 is tightened, both end surfaces in the axial direction (up-down direction in FIG. 4) of the second nut 8 are brought into contact with a second installation surface 32*a* of the second fluid device 32 and the lower surface 24*b* of the plate body 24. Accordingly, the second installation surface 32*a* of the second fluid device 32 is located on the lower side of the base plate 2 via the second nut 8.

In the present embodiment, both end surfaces in the axial direction of the first nut 7 are brought into contact with the first installation surface 31*a* of the first fluid device 31 and the upper surface 24*a* of the plate body 24, and both end surfaces in the axial direction of the second nut 8 are brought into contact with the second installation surface 32*a* of the second fluid device 32 and the lower surface 24*b* of the plate body 24. However, these surfaces do not have to be brought into contact with each other, and spaces may be provided between the first installation surface 31*a* and the upper surface 24*a* and between the second installation surface 32*a* and the lower surface 24*b*.

The other components of the present embodiment are the same as those of the second embodiment, and thus are designated by the same reference signs, and the description thereof is omitted.

In the flow passage unit 1 of the third embodiment as well, the same advantageous effects as those of the second embodiment are achieved. In addition, the length L1 in the axial direction of each gasket 6 is set so as to be longer than the length L2 of the first through hole 21 of the base plate 2. When the first fluid device 31 is removed from the first gasket 61, the upper end portion (first sealing portion 6*b*) of the first gasket 61 projects to the upper side (outside) of the first through hole 21 of the base plate 2. In addition, when the second fluid device 32 is removed from the first gasket 61, the lower end portion (second sealing portion 6*c*) of the first gasket 61 projects to the lower side (outside) of the first through hole 21. Therefore, the first gasket 61 can be easily removed from the base plate 2 by grasping the portion, of the first gasket 61, projecting from the first through hole 21.

Fourth Embodiment

Figure 5:
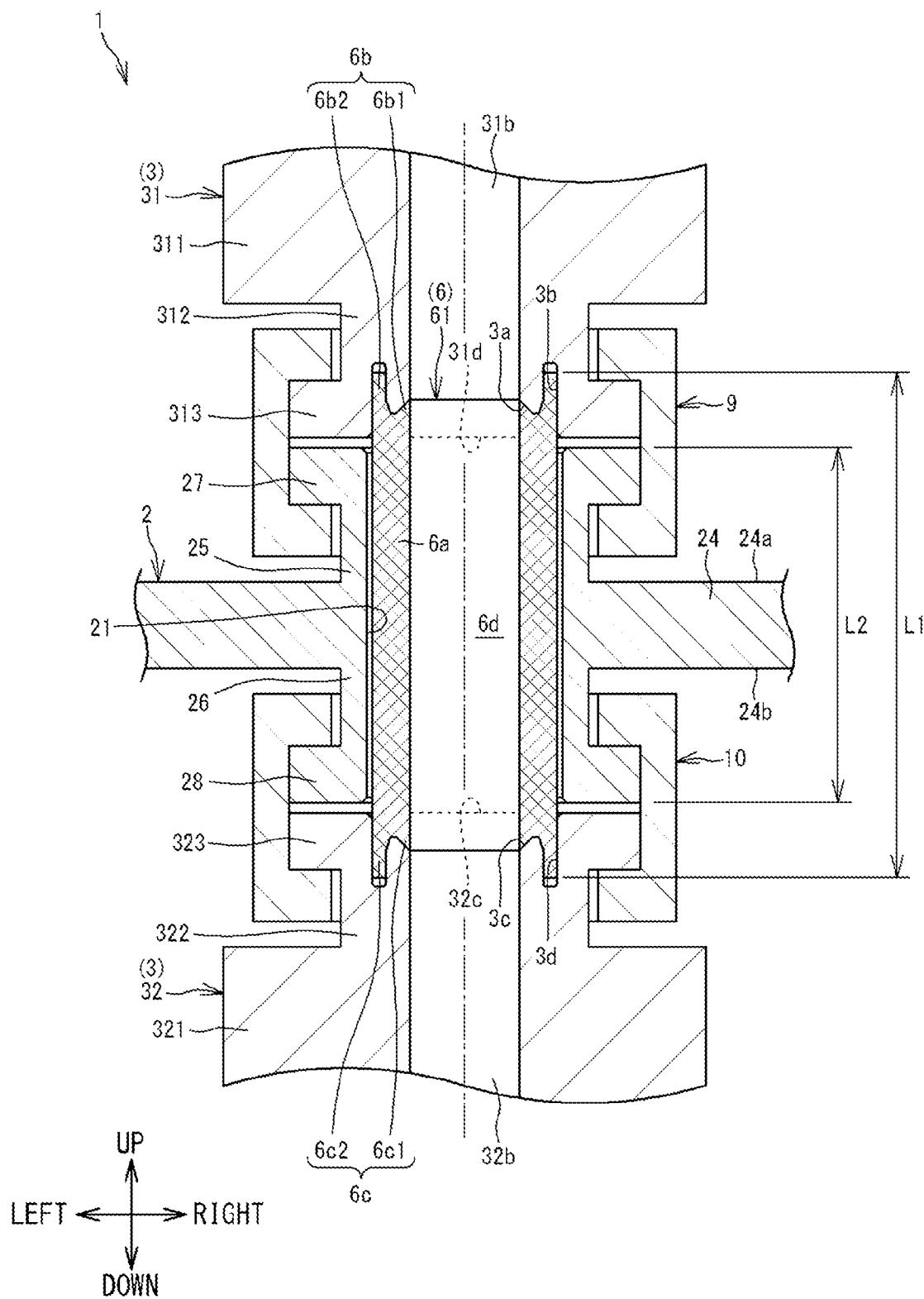
FIG. 5 is a cross-sectional view showing a main part of a flow passage unit according to a fourth embodiment of the present invention.

FIG. 5 is a cross-sectional view showing a main part of a flow passage unit according to a fourth embodiment of the present invention. A flow passage unit 1 of the present embodiment is a modification of the third embodiment. In FIG. 5, a first fluid device 31 has a first body portion 311 and a cylindrical first projection portion 312 projecting downward from the first body portion 311. An annular first flange portion 313 is formed on the outer circumference of a lower end portion of the first projection portion 312 so as to project to the radially outer side (in the right-left direction).

A second fluid device 32 has a second body portion 321 and a cylindrical second projection portion 322 projecting upward from the second body portion 321. An annular second flange portion 323 is formed on the outer circumference of an upper end portion of the second projection portion 322 so as to project to the radially outer side.

A base plate 2 has an annular first flange portion 27 which is formed on the outer circumference of an upper end portion of a first raised portion 25 so as to project to the radially outer side, and an annular second flange portion 28 which is formed on the outer circumference of a lower end portion of a second raised portion 26 so as to project to the radially outer side.

The flow passage unit 1 of the present embodiment includes a first clamp 9 which detachably fixes the first fluid device 31 to the base plate 2, and a second clamp 10 which detachably fixes the second fluid device 32 to the base plate 2.

The first clamp 9 is formed in a substantially C-shaped cross-sectional shape, for example, and connects the first flange portion 313 of the first fluid device 31 and the first flange portion 27 of the base plate 2 by sandwiching and squeezing both flange portions 313 and 27. Accordingly, the first fluid device 31 is installed on the upper side of the base plate 2 via the first clamp 9.

The second clamp 10 is formed in a substantially C-shaped cross-sectional shape, for example, and connects the second flange portion 323 of the second fluid device 32 and the second flange portion 28 of the base plate 2 by sandwiching and squeezing both flange portions 323 and 28. Accordingly, the second fluid device 32 is installed on the lower side of the base plate 2 via the second clamp 10.

A radially inner sealing portion 6b1 and a radially outer sealing portion 6b2 of a first sealing portion 6b in a first gasket 61 are press-fitted into a radially inner sealing groove 3a and a radially outer sealing groove 3b of the first fluid device 31 by tightening the first clamp 9.

A radially inner sealing portion 6c1 and a radially outer sealing portion 6c2 of a second sealing portion 6c in the first gasket 61 are press-fitted into a radially inner sealing groove 3c and a radially outer sealing groove 3d of the second fluid device 32 by tightening the second clamp 10.

The other components of the present embodiment are the same as those of the third embodiment, and thus are designated by the same reference signs, and the description thereof is omitted. In the flow passage unit 1 of the fourth embodiment as well, the same advantageous effects as those of the third embodiment are achieved.

Others

In the above embodiments, the flow passage holes of the fluid device 3 disposed on the upper side and the fluid device 3 disposed on the lower side communicate with each other via the communication flow passage 6d of the gasket 6, but may be caused to communicate with each other only by the through hole 21 (22, 23) of the base plate 2.

Moreover, the flow passage unit of the present invention can also be applied to the liquid crystal/organic EL field, the medical/pharmaceutical field, the automotive-related field, etc., in addition to a semiconductor manufacturing apparatus.

The embodiments disclosed herein are merely illustrative and not restrictive in all aspects. The scope of the present invention is defined by the scope of the claims rather than the meaning described above, and is intended to include meaning equivalent to the scope of the claims and all modifications within the scope.

REFERENCE SIGNS LIST 1 flow passage unit
2 base plate
3 fluid device
6 gasket
6a gasket body
6b first sealing portion
6c second sealing portion
21 first through hole (through hole)
31 first fluid device
31b first flow passage hole
32 second fluid device
32b second flow passage hole
L1 length in axial direction of gasket
L2 length of through hole

The invention claimed is:

1. A flow passage unit comprising a base plate and a plurality of fluid devices provided on the base plate, wherein
the plurality of fluid devices includes at least a first fluid device having a first flow passage hole, and a second fluid device having a second flow passage hole,
the first fluid device is disposed on one side in a thickness direction of the base plate and detachably provided on the base plate, the first fluid device having a first installation surface located on a surface on the one side of the base plate,
the second fluid device is disposed on another side in the thickness direction of the base plate and detachably provided on the base plate, the second fluid device having a second installation surface located on a surface on the another side of the base plate, and
the base plate has a through hole formed so as to penetrate the base plate in the thickness direction of the base plate to provide communication between the first flow passage hole and the second flow passage hole,
the flow passage unit further comprising a gasket disposed in the through hole, wherein the gasket has:
a tubular gasket body having a communication flow passage formed therein so as to provide communication between the first flow passage hole and the second flow passage hole;
a first sealing portion provided on one side in an axial direction of the gasket body and detachably connected to the first fluid device to seal a connection portion therebetween; and
a second sealing portion provided on another side in the axial direction of the gasket body and detachably connected to the second fluid device to seal a connection portion therebetween,
the first fluid device further includes a first projection portion that protrudes to the another side beyond the first installation surface, and an outlet of the first flow passage hole formed in the first projection portion in the through hole, the first projection portion being located in the through hole,
the second fluid device further includes a second projection portion that protrudes to the one side beyond the second installation surface, and an outlet of the second flow passage hole formed in the second projection portion in the through hole, the second projection portion being located in the through hole,
the first sealing portion is detachably connected to the first projection portion, and
the second sealing portion is detachably connected to the second projection portion.

2. The flow passage unit according to claim 1, wherein a length in the axial direction of the gasket is shorter than a length of the through hole.

* * * * *